J. W. ARTHUR.
TIRE CASING HOLDER AND SHIFTER.
APPLICATION FILED AUG. 12, 1918.

1,309,058.

Patented July 8, 1919.
2 SHEETS—SHEET 1.

Witness
H. Woodard

Inventor
J. W. Arthur

By H. B. Willson &Co
Attorneys

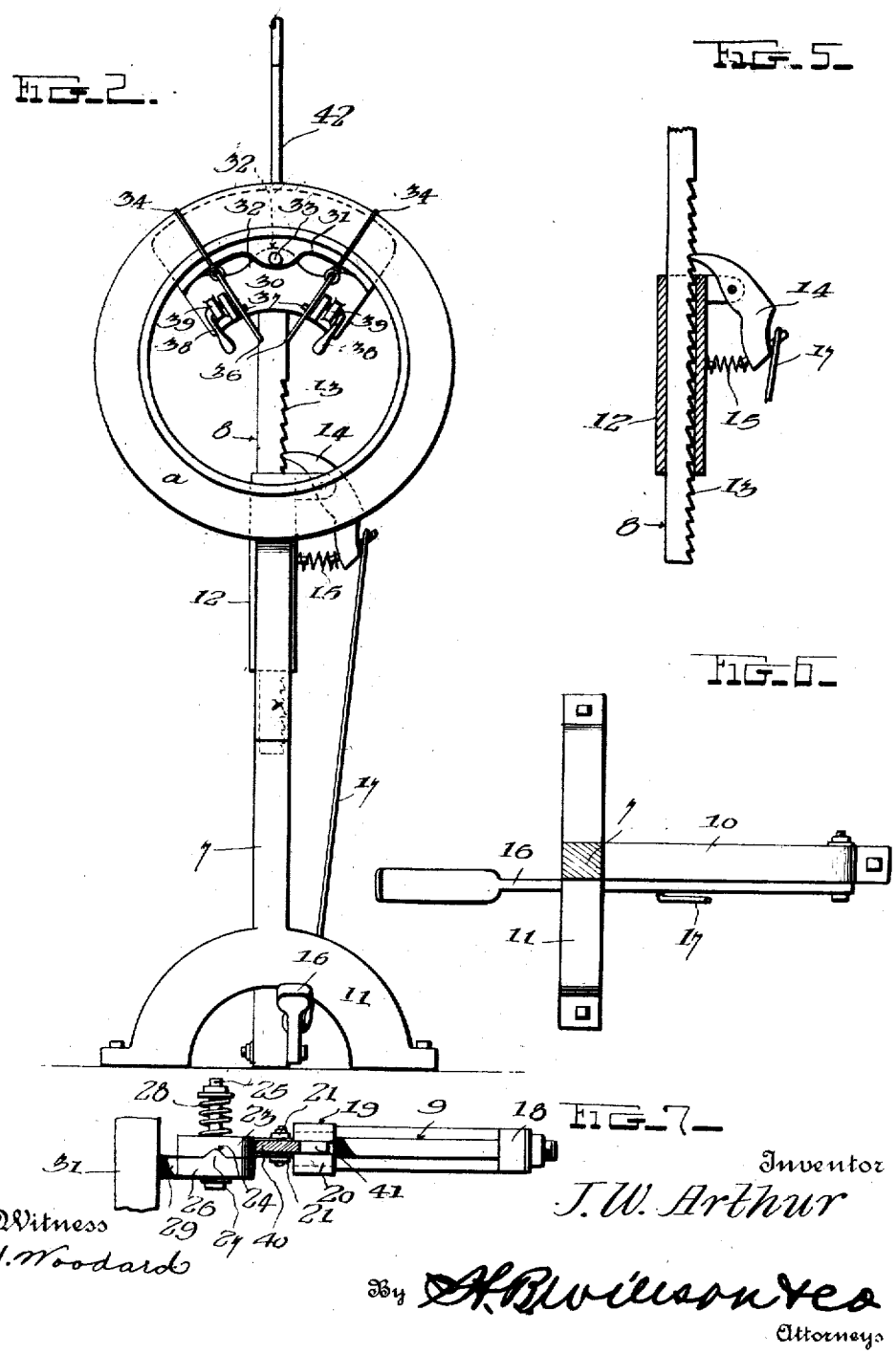

UNITED STATES PATENT OFFICE.

JAMES WHYTE ARTHUR, OF WARREN, OHIO.

TIRE-CASING HOLDER AND SHIFTER.

1,309,058.     Specification of Letters Patent.     Patented July 8, 1919.

Application filed August 12, 1918. Serial No. 249,541.

*To all whom it may concern:*

Be it known that I, JAMES W. ARTHUR, a citizen of the United States, residing at Warren, in the county of Trumbull and State of Ohio, have invented certain new and useful Improvements in Tire-Casing Holders and Shifters; and I do declare the following to be a full, clear, and exact description of the invention, such as will enable others skilled in the art to which it appertains to make and use the same.

This invention relates to a tire-casing holder and shifter, and it relates more particularly to an improved shop-stand for holding and turning automobile casings.

One object of this invention is to provide a device for holding a tire casing in any desired position, and for quickly and easily turning it from one position to another;

Another object is to provide a quickly and easily adjustable device for securely holding a tire-casing of any size;

Another object is to provide a device of this character which is strong, durable, rigid and thoroughly practical; and Another object is to provide a device f this character which consists of few and simple parts and may, therefore, be manufactured at a slight cost.

Other objects and advantages may become apparent to persons who read the following details of description in connection with the accompanying drawings, in which:

Fig. 4 is an enlarged transverse vertical sectional view along the line 4—4 of Fig. 1;

Fig. 5 is a vertical sectional detail view of the middle portion of the structure shown in Fig. 2;

Fig. 6 is a longitudinal sectional view along the line 6—6 of Fig. 1; and

Fig. 7 is a top plan view of the upper portion of the device having a fragment of a tire in position to be supported thereby.

Figure 1:
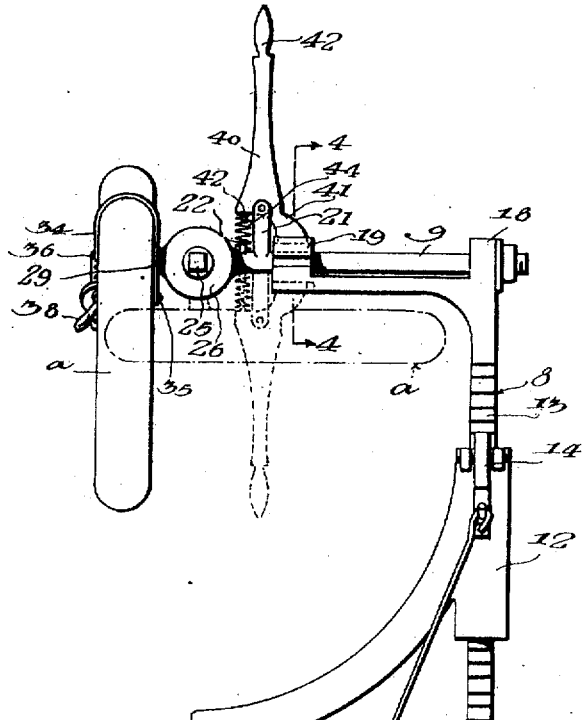
Figure 1 is a side elevation of a tire-casing holder and shifter constructed in accordance with the preferred embodiment of my invention.
Figure 2:
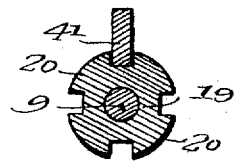
Fig. 2 is a front elevation of the same.
Figure 3:
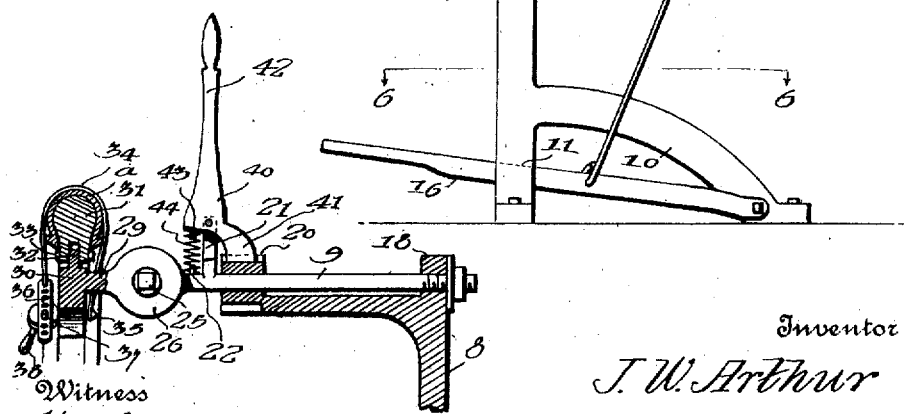
Fig. 3 is a vertical sectional view of the top portion of the structure shown in Fig. 1.

Referring to these drawings in detail, in which similar reference characters correspond with similar parts throughout the several views, a tire casing is indicated by the letter *a* for the purpose of rendering the use and operation of this device obvious. The tire-casing holder and shaft comprises broadly a stationary support 7, a vertically movable support 8, a rotary support 9, and other elements which will be named and described hereinafter.

The stationary support 7 is preferably provided with levers 10 and 11 which may be secured to the floor of a shop or garage by any appropriate means. The upper portion 12 of the member 7 is tubular, and a toothed bar or rack 13 is vertically movable through the tubular element, the latter being provided with bearings to which a pawl 14 is pivotally mounted; and a spring 15 normally holds the pawl 14 in engagement with the teeth of the bar or rack 13, a foot lever 16 being connected to the pawl 14 through the medium of a lug 17. It will be seen, therefore, that the bar or rack 13 may be held in any of a plurality of adjusted positions by means of a pawl 14, and that the lever 16 provides a convenient means for allowing the vertically movable support 8 to be lowered.

The upper end of the member 8 is provided with bearings 18 and 19, the latter being substantially cylindrical and provided with keeper elements 20, as illustrated in Fig. 4, these keeper elements being arranged in an annular series and having notches therebetween.

The rotary support or rotatable device 9 is journaled in the bearings 18 and 19 and is provided with a radial extension 21, an adjacent stud or spring-seat 22 and a centrally apertured disk or circular joint-element 23, the latter being provided with V-notches 24 which are preferably arranged 90 degrees apart, two of these V-notches being vertically alined, and two others being horizontally alined. A bolt or pivot element 25 extends through the central aperture of the disk 23 and through a similar aperture of a disk 26 which forms an element of a second rotatable supporting element, which is provided with tapering lugs 27 which fit interchangeably in the tapering or V-shaped notches 24. A spring 28 coöperates with the bolt 25 and with a nut and washer on this bolt, so as to clamp the disks 23 and 26 together, thereby causing their tapering lugs and notches to hold them yieldingly in any of the three positions illustrated in Fig. 1, in full and broken lines.

It will be seen that by the provision of a greater number of keepers 20, a greater number of adjustments may be effected with regard to the disks 23 and 26 and their adjuncts.

An arm 29 extends radially from the disk 26, and this arm terminates in a clamping element 30. Any one of a plurality of tire-cores or casing-blocks 31 may be removably secured to an apertured ear 32 by means of a bolt or pivot 33 which can be quickly and easily withdrawn when one of the blocks 31 is to be replaced by a larger or smaller one, that is, a block 31 which is larger or smaller in cross section so as to fit snugly within a correspondingly large or small tire-casing. In order to removably secure the tire on the block or core 31, I provide one or more straps or flexible elements 34 which are secured at 35 to the clamping element 30. On the free end of each clamping strap 34 I provide a metal strip or bar 36 having a series of apertures therethrough, and the apertures of these elements 36 are adapted to be interchangeably engaged by studs 37 forming elements in clamping levers 38, these clamping levers being fulcrumed in bearings 39 which are supported by the clamping element 30. From the foregoing, it will be seen that each of the elements 30 to 39 inclusive constitutes a clamping element, and that these clamping elements coöperate with one another for holding tires of different sizes in a secure and definite relation to the supporting elements 26, 27 and 29. When a tire-casing is thus secured to the arm 29, the latter may be swung upward or downward and retained in an upright, depending or horizontal position by coöperation of the tapering lugs and notches 24 and 27. Moreover, it will be seen that the axis of the pivot 25 is radial to the axis of the shaft or device 9, and therefore, the tire-clamp, on the arm 29, may be turned in every direction so as to move the tire to any desirable position to be operated on.

In order to so rotate the device 9 and hold it in different adjusted positions, I provide a lever 40 having a detent 41 extending laterally from the handle portion 42 which extends radially from the axis of the element 9. The detent 41 engages alternately with notches between the keepers 20. A spring-seat 43 is provided on the lever 40, and a spring 44 is seated between the spring-seats 22 and 43 and normally holds the detent 41 in its effective position.

The pivot of the lever 40 is between the detent 41 and the arm 29 which supports the tire-casing being operated on, and therefore, in order to release the rotary device 9 from the keeper element 19, the operator pulls the lever 40 toward him and then turns it laterally so as to shift the tire toward his right or his left; this being a very convenient and easy mode of adjusting the tire-casing into the most easily accessible position for operating thereon.

Although I have described this embodiment of my invention very specifically it is not intended to limit this invention to these exact details of construction and arrangement of the parts, for I am entitled to make changes within the scope of the inventive idea disclosed in the foregoing description and following claims.

What I claim as my invention is:

1. A tire-casing holder and shifter comprising a rotatable device, means for securing a tire thereto, a bearing in which said rotatable device is seated, and a lever pivotally secured on said rotatable device to rotate therewith and being operable to rotate the latter and engageable with said bearing for holding said rotatable device in different angles about its axis.

2. A tire-casing holder and shifter comprising a rotatable device having a substantially radial extension and a spring-seat adjacent to the lateral extension, a bearing having an annular series of keeper elements therearound, said rotatable device being journaled in said bearing, a lever pivotally mounted on said lateral extension to rotate with said rotatable device, said lever consisting of a handle portion and a detent and a spring-seat, a spring seated between the first and second said spring-seats and constantly tending to hold said detent in engagement with one or another of said keepers, said handle portion of the lever being normally substantially radial with relation to the axis of said rotatable device, and means on said rotatable device for securing a tire casing thereto.

3. A tire-casing holder and shifter comprising a rotatably mounted device, a core adapted to be fitted within a tire-casing and being secured to said rotatably mounted device, a flexible element secured to said device, and means on said device and coöperative with said flexible element to clamp a tire-casing on said core.

4. A tire-casing holder and shifter comprising a rotatably mounted device, a core adapted to be fitted within a tire-casing and being secured to and easily removable from said rotatably mounted device, a flexible element secured to said device, and means on said device and coöperative with said flexible element to clamp a tire-casing on said core, said means being adjustable to increase and decrease the effective scope of said flexible element, whereby cores of different cross sections may coöperate with said flexible element and its adjusting means to clamp tire-casings of different sizes in cross sections, substantially as described.

In testimony whereof I have hereunto set my hand.

JAMES WHYTE ARTHUR.